US008768072B2

(12) United States Patent
Jang

(10) Patent No.: US 8,768,072 B2
(45) Date of Patent: Jul. 1, 2014

(54) APPARATUS AND METHODS TO COMPRESS STILL IMAGES

(75) Inventor: Sung-kyu Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 12/283,370

(22) Filed: Sep. 11, 2008

(65) Prior Publication Data

US 2009/0103817 A1    Apr. 23, 2009

(30) Foreign Application Priority Data

Oct. 23, 2007    (KR) .................. 10-2007-0106742

(51) Int. Cl.
*G06K 9/36*    (2006.01)
*G06K 9/46*    (2006.01)

(52) U.S. Cl.
USPC ........................................................ 382/232

(58) Field of Classification Search
USPC ................. 382/164, 173, 232, 239, 240, 244; 375/240.1, 240.24, 240.26, E7.09, 375/E07.2, E7.129; 348/222.1, 333.01, 348/E05.062
See application file for complete search history.

(56) References Cited

U.S. PATENT DOCUMENTS

| | | | | |
|---|---|---|---|---|
| 5,067,015 | A  * | 11/1991 | Combridge et al. | ..... 375/240.11 |
| 6,625,319 | B1 | 9/2003 | Krishnamachari | |
| 6,633,608 | B1 * | 10/2003 | Miller | ...... 375/240.02 |
| 6,804,403 | B1 | 10/2004 | Wang et al. | |
| 7,215,819 | B2 * | 5/2007 | Onno et al. | ................... 382/240 |
| 7,660,470 | B2 * | 2/2010 | Yano | .............................. 382/232 |
| 2004/0105501 | A1 | 6/2004 | Maeda | |
| 2006/0104525 | A1 | 5/2006 | Gringeler et al. | |
| 2007/0035651 | A1 * | 2/2007 | Harada et al. | ............ 348/333.01 |
| 2007/0172133 | A1 | 7/2007 | Kim et al. | |
| 2007/0253479 | A1 * | 11/2007 | Mukherjee | ................. 375/240.1 |
| 2009/0103817 | A1 * | 4/2009 | Jang | .............................. 382/232 |

FOREIGN PATENT DOCUMENTS

| | | |
|---|---|---|
| CN | 1310913 A | 8/2001 |
| EP | 1 345 176 A1 | 9/2003 |
| JP | 2001-094932 A | 4/2001 |
| JP | 2002-052220 A | 2/2002 |
| JP | 3893350 B2 | 12/2006 |
| KR | 2000-0028935 A | 5/2000 |
| WO | WO 99/05851 A2 | 2/1999 |
| WO | WO 00/10131 A1 | 2/2000 |
| WO | WO 02/17230 A2 | 2/2002 |
| WO | WO 2005/076627 A1 | 8/2005 |

OTHER PUBLICATIONS

Examination Report established for GB 0816570.6 (May 8, 2012).
Office Action established for CN 200810168031.2 (Jan. 4, 2012).
Examination Report established for GB 0816570.6 (Sep. 3, 2012).
Office Action established for CN 200810168031.2 (Aug. 28, 2012).
Office Action issued for KR 10-2007-0106742 (Oct. 31, 2013).

* cited by examiner

*Primary Examiner* — Amir Alavi
(74) *Attorney, Agent, or Firm* — Drinker Biddle & Reath LLP

(57) ABSTRACT

A digital image processing apparatus for significantly reducing an image file size in order to store a large number of image files, a method of controlling the same, a recording medium storing a program for executing the method, and a digital image compressing method. The digital image processing apparatus comprises a sub-image generator for generating a plurality of sub-images from a still image, and a moving image compressor for considering the still image as a moving image by using each of the sub-images as a frame image and compressing the moving image having the frame images.

20 Claims, 7 Drawing Sheets

APPARATUS AND METHODS TO COMPRESS STILL IMAGES

CROSS-REFERENCE TO RELATED PATENT APPLICATION

This application claims the benefit of Korean Patent Application No. 10-2007-0106742, filed on Oct. 23, 2007, in the Korean Intellectual Property Office, the disclosure of which is incorporated herein in its entirety by reference.

BACKGROUND OF THE INVENTION

1. Field of the Invention

The present invention relates to a digital image processing apparatus, a method of controlling the same, a recording medium storing a program for executing the method and a digital image compressing method. More particularly, the present invention relates to a digital image processing apparatus for reducing an image file size in order to store a large number of image files, a method of controlling the same, a recording medium storing a program for executing the method and a digital image compressing method.

2. Description of the Related Art

A digital image processing apparatus stores an image file in a storage medium or reproduces an image file stored in the storage medium in order to display an image corresponding to the image file using a display unit. A digital photographing apparatus, which is a type of digital image processing apparatus, captures an image of an object and stores the captured image as an image file in a storage medium.

A conventional digital image processing apparatus compresses a still image using a still image compression method, such as JPEG, and stores the compressed still image in a storage medium. The compression is performed to reduce the size of an image file stored in the storage medium. However, a conventional still image compression method has limitations in reducing the size of an image file. Accordingly, if a user cannot further store an image file in a storage medium of a digital image processing apparatus, the user has no choice but to delete some of the image files previously stored in the storage medium or replace the storage medium with another storage medium in which the image file can be stored.

SUMMARY OF THE INVENTION

The present invention provides a digital image processing apparatus for largely reducing an image file size in order to store a large number of image files, a method of controlling the same, a recording medium storing a program for executing the method, and a digital image compressing method.

Accordingly, an embodiment of the present invention provides a digital image processing apparatus including a sub-image generator for generating a plurality of sub-images from a still image, and a moving image compressor which considers the still image as a moving image by using each of the sub-images as a frame image and compresses the moving image having the frame images.

The sub-image generator may split the still image into sub-images having sizes acceptable by the moving image compressor. Also, the sub-image generator may split the still image into sub-images having the same or substantially the same size. Furthermore, the sub-image generator may sub-sample the still image to generate sub-images having sizes acceptable by the moving image compressor.

The digital image processing apparatus may further include a display unit, where one of the sub-images generated by the sub-image generator is displayed on the display unit when displaying the still image on the display unit. The digital image processing apparatus may further include a sub-image rearrangement unit rearranging the sub-images generated by the sub-image generator such that sub-images having a certain degree of correlation (i.e., high correlation) are arranged adjacent to each other. The moving image compressor considers the still image as a moving image by using the rearranged sub-images as a series of frame images and compresses the moving image having the frame images. The sub-image rearrangement unit may determine that sub-images have high correlation when similarity of the sub-images is high.

The digital image processing apparatus may further include a correlation coefficient calculator for calculating a correlation coefficient $Cost_{n,m}$ between an $n^{th}$ sub-image and an $m^{th}$ sub-image, before being rearranged by the sub-image rearrangement unit, according to the following equation when data of a pixel (x, y) of the $n^{th}$ sub-image is $P_n(x, y)$, $$Cost_{n,m} = \sum_{x,y} |P_n(x, y) - P_m(x, y)|$$

where the sub-image rearrangement unit determines that the $n^{th}$ sub-image and the $m^{th}$ sub-image have high correlation when the correlation coefficient $Cost_{n,m}$ is small. The moving image compressor may compress the moving image using MPEG or H.264.

Another embodiment of the present invention provides a method of controlling a digital image processing apparatus. The method includes the operations of generating a plurality of sub-images from a still image, and considering the still image as a moving image by using each of the sub-images as a frame image and compressing the moving image having the frame images.

The operation of generating the sub-images may include the operation of splitting the still image into sub-images having sizes acceptable by a moving image compressor of the digital image processing apparatus. Also, the operation of generating the sub-images may include the operation of splitting the still image into sub-images having the same or substantially the same size. The operation of generating the sub-images may further include the operation of sub-sampling the still image to generate sub-images having sizes acceptable by the moving image compressor of the digital image processing apparatus. The method may further include the operation of displaying one of the sub-images on a display unit of the digital image processing apparatus when displaying the still image on the display unit of the digital image processing apparatus.

The operation of considering the still image as a moving image may include the operation of rearranging the sub-images such that sub-images having high correlation are arranged adjacent to each other, considering the still image as a moving image by using the rearranged sub-images as a series of frame images, and compressing the moving image having the frame images. It may be determined that sub-images have high correlation when similarity of the sub-images is high.

The method may further include the operation of calculating a correlation coefficient $Cost_{n,m}$ between an $n^{th}$ sub-image and an $m^{th}$ sub-image, before being rearranged by the sub-image rearrangement unit, according to the following equation when data of a pixel (x, y) of the $n^{th}$ sub-image is $P_n(x, y)$, $$Cost_{n,m} = \sum_{x,y} |P_n(x, y) - P_m(x, y)|$$

where it is determined that the $n^{th}$ sub-image and the $m^{th}$ sub-image have high correlation when the correlation coefficient $Cost_{n,m}$ is small. The operation of compressing the moving image may use MPEG or H.264.

Another embodiment of the present invention provides a recording medium for storing a program for executing the method.

Another embodiment of the present invention provides a digital image compressing method including the operations of generating a plurality of sub-images from a still image, and considering the still image as a moving image by using each of the sub-images as a frame image and compressing the moving image having the frame images.

As will be appreciated by one skilled in the art, the embodiments of the present invention described herein are capable of significantly reducing an image file size to store a large number of image files.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
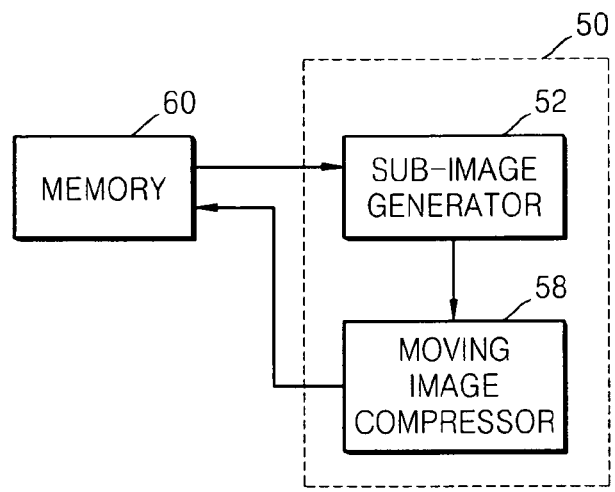
FIG. 1 is a functional block diagram of an example of a digital image processing apparatus according to an embodiment of the present invention.

Exemplary embodiments of the present invention will now be described more fully with reference to the accompanying drawings. The invention may, however, be embodied in many different forms and should not be construed as being limited to the embodiments set forth herein. Throughout the drawings, like reference numerals refer to like elements.

FIG. 1 is a functional block diagram of an example of a digital image processing apparatus according to an embodiment of the present invention. Referring to FIG. 1, the digital image processing apparatus includes a sub-image generator 52 and a moving image compressor 58. Even though in FIG. 1 the sub-image generator 52 and the moving image compressor 58 are included in a digital signal processing unit 50, the sub-image generator 52 and the moving image compressor 58 can be independent components of the digital signal processing unit 50.

The sub-image generator 52 generates a plurality of sub-images from a single still image. The moving image compressor 58 con the still image as a moving image using each of the sub-images generated by the sub-image generator 52 as a single frame image, and compresses the moving image having the frame images. Here, compressing the moving image means compressing a moving image file or compressing an image into a moving image file. The aforementioned description regarding compressing the image will be also applied to embodiments and modified embodiments to be described later. The operations of the sub-image generator 52 and the moving image compressor 58 are explained with reference to FIGS. 2 and 3.

Figure 2:
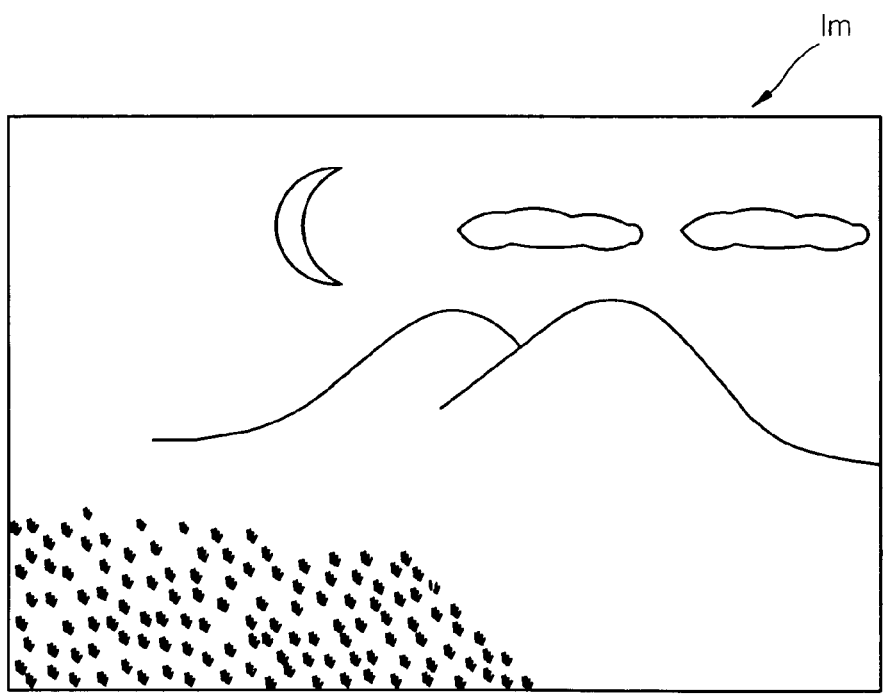
FIGS. 2 and 3 are exemplary diagrams for explaining image compression performed by the digital image processing apparatus illustrated in FIG. 1.
Figure 3:
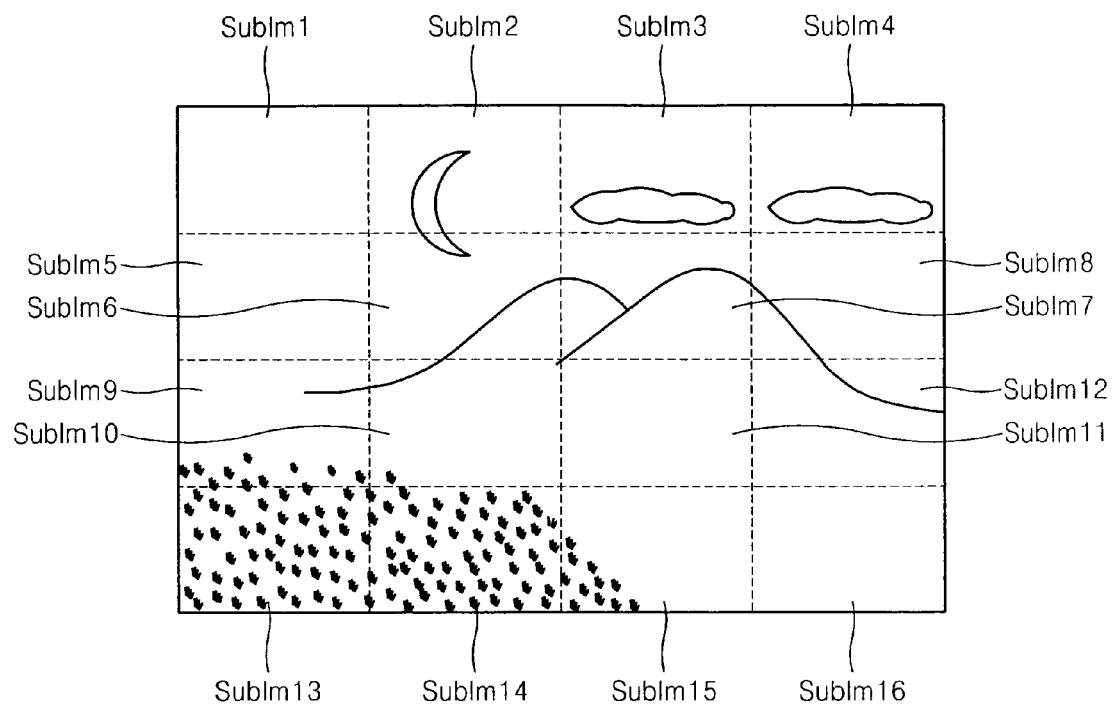

FIGS. 2 and 3 are exemplary diagrams for explaining image compression performed by the digital image processing apparatus illustrated in FIG. 1. Referring to FIGS. 1, 2 and 3, the sub-image generator 52 splits a still image Im illustrated in FIG. 2 into 16 sub-images SubIm1-16 as illustrated in FIG. 3, which each have a size acceptable by the moving image compressor 58. Even though the still image Im is split into the 16 sub-images in FIG. 3, the number of sub-images is not limited thereto. In the present embodiment, as illustrated in FIG. 3, the sub-image generator 52 splits the still image Im into sub-images having the same or substantially the same size.

As described above, the sub-image generator 52 splits the still image Im into the sub-images. When each of the sub-images is considered as a single frame image of a moving image, the still image Im can be considered as a single moving image. That is, if the sub-image generator 52 generates the sub-images as illustrated in FIG. 3 from the still image Im illustrated in FIG. 2, the still image Im can be considered as a single moving image having 16 frame images.

The moving image compressor 58 compresses the moving image using a conventional moving image compression method. For example, the moving image compressor 58 extracts data regarding the differences between a reference sub-image selected from among the 16 sub-images illustrated in FIG. 3 and all of the other sub-images, based on the reference sub-image. That is, the respective differences between the reference sub-image and each of the sub-images are compared, and one sub-image is selected based on compression efficiency and stored along with the differences in a storage medium of the digital image processing apparatus. Accordingly, the size of an image file stored in the storage medium can be significantly reduced as compared to a case that data of all the sub-images, other than the reference sub-image, is stored in the storage medium of the digital image processing apparatus. Also, a plurality of sub-images can be selected as reference sub-images and the sub-images can be sequentially changed.

For example, sub-image SubIm2 illustrated in FIG. 3 is distinguished from the sub-image SubIm1 in that there is a moon, and thus, the moving image compressor 58 extracts data corresponding to the moon in the sub-image SubIm2.

The sub-image SubIm3 illustrated in FIG. 3 is distinguished from the sub-image SubIm2 in that there is a cloud instead of a moon, and thus, the moving image compressor 58 extracts data corresponding to the moon in the sub-image SubIm2 and data corresponding to the cloud in the sub-image SubIm3. The sub-image SubIm4 illustrated in FIG. 3 is similar to the sub-image SubIm3, and thus the moving image compressor 58 hardly extracts data from the sub-image SubIm4.

In this manner, the moving image compressor 58 extracts data corresponding to a difference between two sub-images and stores the extracted data and data of the sub-image SubIm1 in the storage medium of the digital image processing apparatus. In addition, the moving image compressor 58 stores additional data regarding the order of sub-images, which represents the position of extracted data, in the storage medium of the digital image processing apparatus. Hence, the digital image processing apparatus according to this embodiment of the present invention can significantly reduce the quantity of data stored in the storage medium as compared to a conventional digital image processing apparatus that stores all the data of sub-images in the storage medium. Since the conventional digital image processing apparatus includes a moving image compressor, the digital image processing apparatus according to this embodiment of the present invention can be easily implemented by adding the sub-image generator 52 that generates a plurality of sub-images from a still image to significantly decrease the quantity of data to be stored in the storage medium. The moving image compressor 58 can compress an image considered as a moving image using various methods such as MEPG or H.264, or any other suitable technique.

As can be appreciated by one skilled in the art, the aforementioned method of extracting data corresponding to a difference between sub-images considered as frame images of a moving image is exemplary and various moving image compression methods can be applied. That is, a still image is considered as a moving image by using sub-images generated from the still image by the sub-image generator 52 of the digital image processing apparatus according to the this embodiment of the present invention as frame images, and the moving image is compressed using various moving image compression methods.

Although FIG. 3 illustrates that the sub-image generator 52 sequentially splits the still image Im illustrated in FIG. 2 to generate the sub-images, the sub-image generator 52 can generate the sub-images from the still image Im through various methods. For example, the sub-image generator 52 can sub-sample the still image Im illustrated in FIG. 2 to generate sub-images having sizes acceptable by the moving image compressor 58, and the sub-sampling is performed to extract data from the still image Im illustrated in FIG. 2 at a predetermined interval to generate sub-images.

Figure 4A:
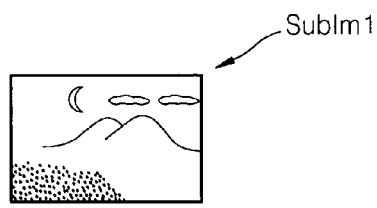
FIGS. 4A and 4B are exemplary diagrams for explaining image compression performed by the digital image processing apparatus illustrated in FIG. 1.
Figure 4B:
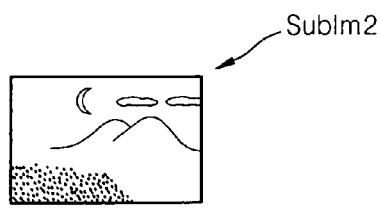

If the still image Im illustrated in FIG. 2 has a size of 6400×4800 pixels the positions of pixels of the still image Im can be represented as (1, 1), ... (1, m), (2, 1), ..., (2, m), (3, 1), ..., (3, m), ..., (n, 1), (n, 2), ..., (n, m) where m=6400 and n=4800. When the still image Im is sub-sampled at 1:4, data corresponding to pixels in positions (1, 1), (1, 5), (1, 9), ..., (1, 6393), (1, 6397), (5, 1), (5, 5), (5, 9), ..., (5, 6393), (5, 6397), ..., (9, 1), (9, 5), (9, 9), ..., (4797, 1), (4797, 5), (4797, 9), ..., (4797, 6393), (4797, 6397) is extracted to obtain a first sub-image in a size of 1600×1200 pixels, and data corresponding to pixels in positions (1, 2), (1, 6), (1, 10), ..., (1, 6394), (5, 2), (5, 6), (5, 10), ..., (5, 6394), (5, 6398), ..., (9, 2), (9, 6), (9, 10), ..., (4797, 2), (4797, 6), (4797, 10), ..., (4797, 6394), (4797, 6398) is extracted to obtain a second sub-image in a size of 1600×1200 pixels. In this manner, a total 16 1600×1200 sub-images are attained. FIGS. 4A and 4B illustrate an example of two sub-images from among the 16 sub-images. The sub-images illustrated in FIGS. 4A and 4B are similar to each other. When the sub-image generator 52 generates these 16 sub-images, the moving image compressor 58 extracts only data corresponding to a difference between neighboring sub-images and stores the extracted data and a predetermined reference sub-image in the storage medium of the digital image processing apparatus. Accordingly, the quantity of data stored in the storage medium of the digital image processing apparatus can be significantly reduced.

Figure 5:
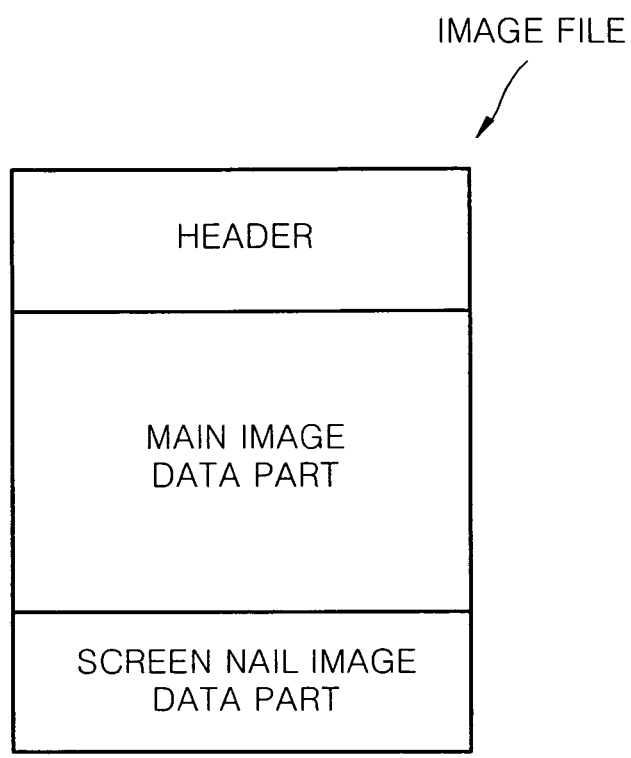
FIG. 5 illustrates an example of a configuration of an image file stored in a storage medium of the digital image processing apparatus illustrated in FIG. 1.

FIG. 5 illustrates an exemplary configuration of an image file stored in the storage medium of the digital image processing apparatus, according to the current embodiment of the present invention. Referring to FIG. 5, the image file includes a header, a main image data part and a screen nail image data part. As understood in the art, the term "screen nail image" refers to a single image that is displayed on a display screen and represents an image file. The screen nail image is larger than what would generally be referred to as a "thumbnail image." Although it is common to simultaneously display multiple thumbnail images on a display screen, one screen nail image is displayed on a display screen at any given time. The configuration of an image file stored/reproduced in/from the storage medium of the digital image processing apparatus, according to this embodiment of the present invention, is not limited to the configuration illustrated in FIG. 5.

The main image data part stores data regarding a still image. The header stores data regarding a digital photographing apparatus manufacturer, a photographing date and time, a shutter speed, an iris value, a zoom magnification and a thumbnail image. The thumbnail image corresponds to a reduced image of a main image stored in the main image data part. That is, the digital image processing apparatus may reproduce a plurality of image files stored in the storage medium according to a signal input by a user and simultaneously display images, corresponding to the reproduced image files, on a display unit. In this embodiment, the displayed images are thumbnail images. Since a thumbnail image is very small, image data used to display the thumbnail image on the display unit is additionally provided in the corresponding image file.

The screen nail image data part stores image data that is used when an image file is reproduced and an image corresponding to the reproduced image file is displayed on the display unit. The display unit included in the digital image processing apparatus may have a small size, and thus, there is no need to display a screen nail image on the display unit using image data (that is, still image data) stored in the main image data part. In particular, since the size of data stored in the main image data part is generally much larger than the size of data required to display the screen nail image on the display unit, a time required for data processing is increased and the quality of the screen nail image displayed on the display unit is deteriorated if the screen nail image is displayed on the display unit using the data stored in the main image data part. Accordingly, small-size data required to display the screen nail image displayed on the display unit of the digital image processing apparatus is additionally provided in an image file. This data corresponds to the data stored in the screen nail image data part.

Although the image file stored in the storage medium of the digital image processing apparatus includes the screen nail image data part, as described above, there is no need to additionally provide the screen nail image data part in the image file if the sub-image generator 52 generates a plurality of sub-images from a still image through sub-sampling because a single sub-image can be considered as a reduced image of the still image Im, as illustrated in FIG. 4A. Accordingly, when the still image Im is reduced and displayed on the display unit of the digital image processing apparatus, one of the sub-images generated by the sub-image generator 52 can be used.

Figure 6:
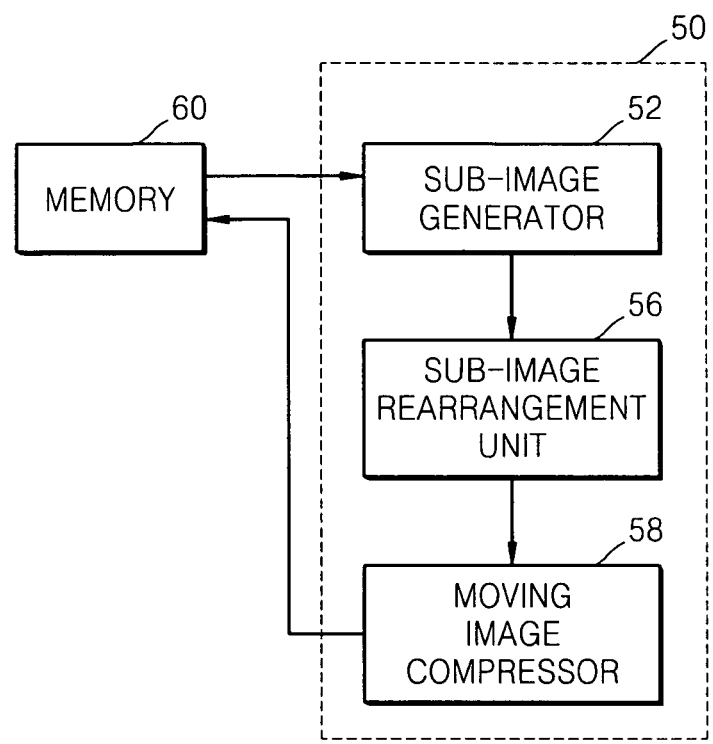
FIG. 6 is a functional block diagram of an example of a digital image processing apparatus according to another embodiment of the present invention.

FIG. 6 is a functional block diagram of an example of a digital image processing apparatus according to another embodiment of the present invention. The digital image processing apparatus includes a sub-image rearrangement unit 56 in addition to the sub-image generator 52 and the moving image compressor 58 included in the digital image processing apparatus illustrated in FIG. 1. The sub-image rearrangement unit 56 rearranges sub-images generated by the sub-image generator 52 from a still image, such that sub-images having high correlation are arranged adjacent to each other. The moving image compressor 58 considers the still image as a moving image by using the rearranged sub-images as a series of frame images and compresses the moving image having the frame images.

For example, when the sub-image generator 52 splits the still image Im illustrated in FIG. 2 to generate the sub-images illustrated in FIG. 3, the sub-images SubIm1 and SubIm5 are similar to each other, the sub-images SubIm3 and SubIm4 are similar to each other, and the sub-images SubIm13 and SubIm14 are similar to each other. Furthermore, the sub-images SubIm16 and SubIm1 may be similar to each other.

As described above, the moving image compressor 58 extracts data corresponding to a difference between two sub-images, and thus, the quantity of extracted data is decreased when the two sub-images are similar to each other. This reduces the quantity of data stored in the storage medium of the digital image processing apparatus. Accordingly, the sub-image rearrangement unit 56 rearranges sub-images generated from a still image such that similar sub-images are sequentially arranged and the moving image compressor 58 considers the still image as a moving image by using the rearranged sub-images as frame images and compresses the moving image having the frame images to significantly increase a compression rate. The sub-image rearrangement unit 56 can determine that sub-images have high correlation when similarity of the sub-images is high.

Figure 7:
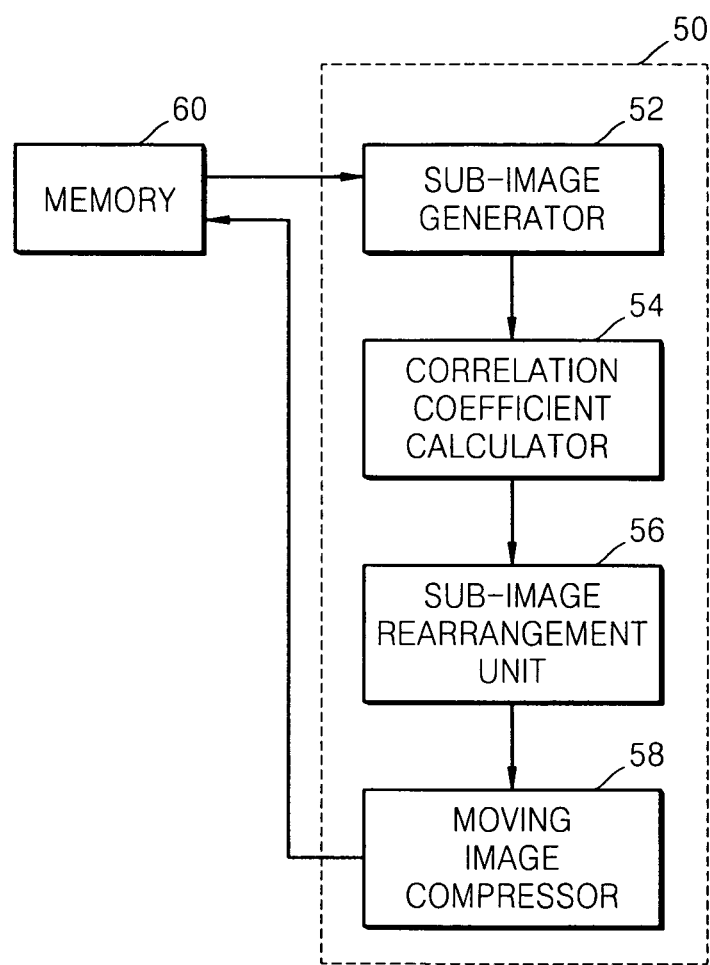
FIG. 7 is a functional block diagram of an example of a digital image processing apparatus according to another embodiment of the present invention.

FIG. 7 is a functional block diagram of an example of a digital image processing apparatus according to another embodiment of the present invention. The digital image processing apparatus further includes a correlation coefficient calculator 54 in addition to the components of the digital image processing apparatus illustrated in FIG. 6.

The correlation coefficient calculator 54 calculates a correlation coefficient $Cost_{n,m}$ between an $n^{th}$ sub-image and an $m^{th}$ sub-image, before being rearranged by the sub-image rearrangement unit 56, according to Equation 1 when data of a pixel (x, y) of the $n^{th}$ sub-image is $P_n(x, y)$.

$$Cost_{n,m} = \sum_{x,y} |P_n(x, y) - P_m(x, y)| \qquad \text{[Equation 1]}$$

$|P_n(x, y)-P_m(x, y)|$ corresponds to the absolute value of a difference between the data of the pixel (x, y) of the $n^{th}$ sub-image and data of the pixel (x, y) of the $m^{th}$ sub-image before being rearranged. The similarity of the $n^{th}$ sub-image and the $m^{th}$ sub-image becomes higher as $|P_n(x, y)-P_m(x, y)|$ decreases. Accordingly, a correlation between the $n^{th}$ sub-image and the $m^{th}$ sub-image, before being rearranged by the sub-image rearrangement unit 56, increases as the correlation coefficient $Cost_{n,m}$ between the $n^{th}$ sub-image and the $m^{th}$ sub-image, before being rearranged by the sub-image rearrangement unit 56, decreases. That is, the correlation coefficient calculator 56 calculates a correlation coefficient between two sub-images and the sub-image rearrangement unit 56 determines that the two sub-images have high correlation when the correlation coefficient between the two sub-images is small and rearranges sub-images such that sub-images having high correlation are arranged adjacent to each other. This significantly reduces the quantity of data stored in the storage medium of the digital image processing apparatus.

The correlation coefficient $Cost_{n,m}$ between the $n^{th}$ sub-image and the $m^{th}$ sub-image, before being rearranged by the sub-image rearrangement unit 56, can be calculated through various methods. For example, $Cost_{n,m}$ can be calculated using Equation 2.

$$Cost_{n,m} = \sum_{x,y} \{P_n(x, y) - P_m(x, y)\}^2 \qquad \text{[Equation 2]}$$

Figure 8:
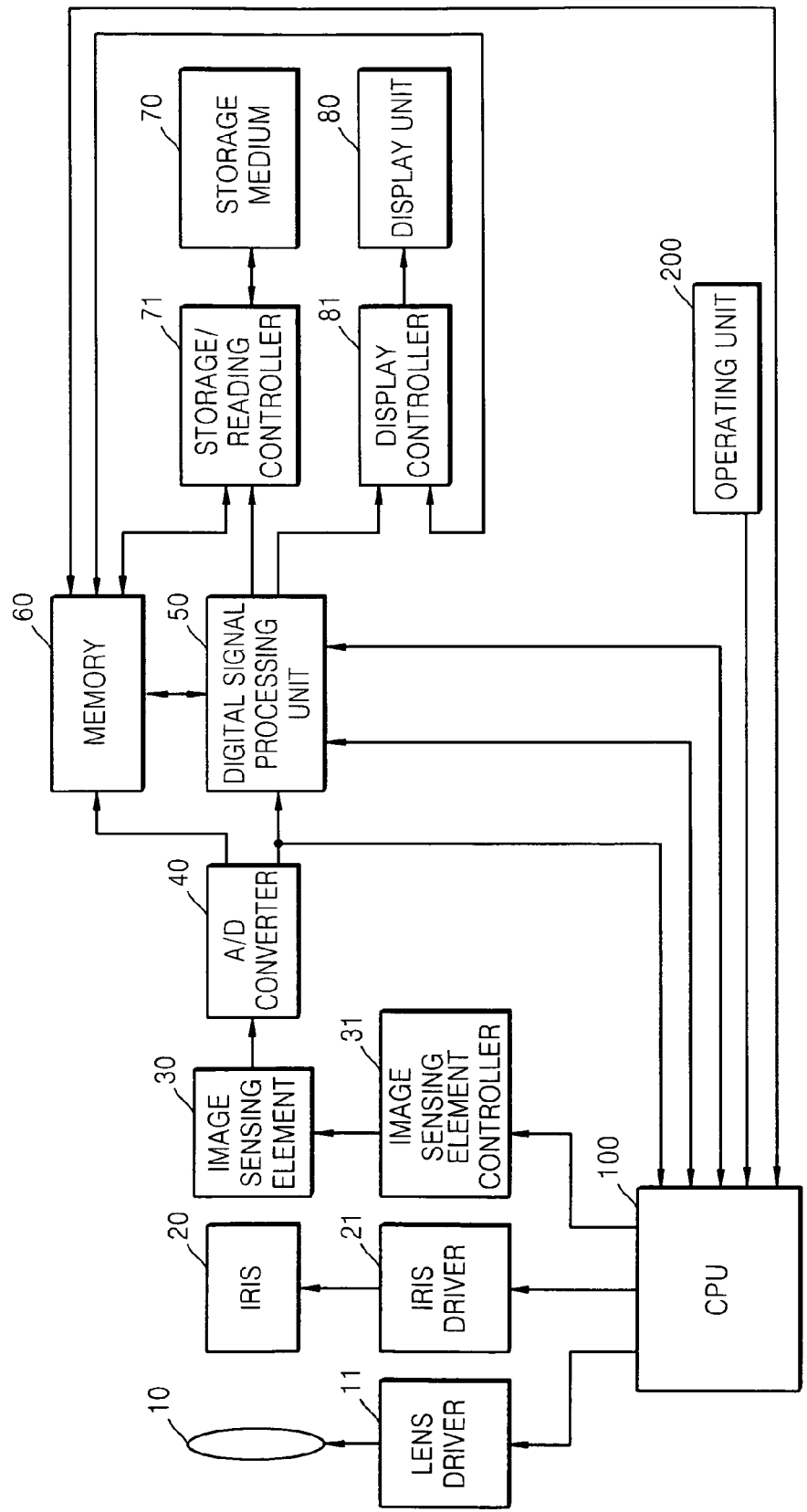
FIG. 8 is a block diagram of an example of a digital photographing apparatus as a digital image processing apparatus according to another embodiment of the present invention.

FIG. 8 is a functional block diagram of an example of a digital photographing apparatus as a digital image processing apparatus, according to another embodiment of the present invention. The overall operation of the digital photographing apparatus is controlled by a CPU 100. The digital photographing apparatus includes an operating unit 200 having a key that generates an electric signal in response to an input from a user. The electric signal from the operating unit 200 is transmitted to the CPU 100 in order for the CPU 100 to control the digital photographing apparatus according to the electric signal.

In a photographing mode, the electric signal from the operating unit 200 is applied to the CPU 100 in order for the CPU 100 to control a lens driver 11, an iris driver 21 and an image sensing element controller 31 according to the electric signal. Accordingly, the position of a lens 10, a degree to which an iris 20 is opened and the sensitivity of an image sensing element 30 are controlled. When a data signal corresponding to an image is output from the image sensing element 30, the data signal is converted into digital image data by an analog-to-digital converter 40 and applied to the CPU 100, and at least one of a digital signal processing unit 50 and a memory 60. The digital signal processing unit 50 performs a digital signal processing operation such as gamma correction, white balancing, etc. The memory 60 includes a read only memory (ROM) or a random access memory (RAM).

The image data output from the digital image processing unit 50 is transmitted to a display controller 81 via the memory 60 or directly transmitted to the display controller 81. The display controller 81 controls a display unit 80 to display an image. The image data output from the digital signal processing unit 50 is input to a storage/reading controller 71 via the memory 60 or directly applied to the storage/reading controller 71. The storage/reading controller 71 stores the image data in a storage medium 70 according to a signal from the user or automatically. The storage/reading controller 71 can read image data from an image file stored in the storage medium 70 and input the image data to the display controller 81 via the memory 60 or another path such that the display unit 80 displays an image corresponding to the image data. The storage medium 70 can be detachably attached to the digital photographing apparatus or permanently mounted in the digital photographing apparatus.

The aforementioned digital photographing apparatus can include a sub-image generator and a moving image compressor in the digital signal processing unit 50 or separately from the digital signal processing unit 50 to significantly reduce the size of an image file stored in the storage medium 70. In particular, if a user cannot further store an image file in the storage medium 70 according to a conventional method such as JPEG, it is possible to compress image files previously stored in the storage medium 70 using the sub-image generator 52 and the moving image compressor 58, and re-store the image files in the storage medium 70 to reduce the quantity of data stored in the storage medium 70 and secure a marginal space in the storage medium 70. It is also possible to compress data of a still image captured whenever a photographing operation is performed using the sub-image generator 52 and the moving picture compressor 58 and store the compressed data in the storage medium 70. Furthermore, it is also possible to compress only images selected by a user from images stored in the storage medium 70 using the sub-image generator 52 and the moving image compressor 58 and store the compressed images in the storage medium 70.

The digital image processing apparatus according to this embodiment of the present invention is not limited to the digital photographing apparatus illustrated in FIG. 8. The digital image processing apparatus according to the present invention includes various digital image processing apparatus such as personal digital assistants (PDAs) and portable multimedia players (PMPs), to name a few.

Figure 9:
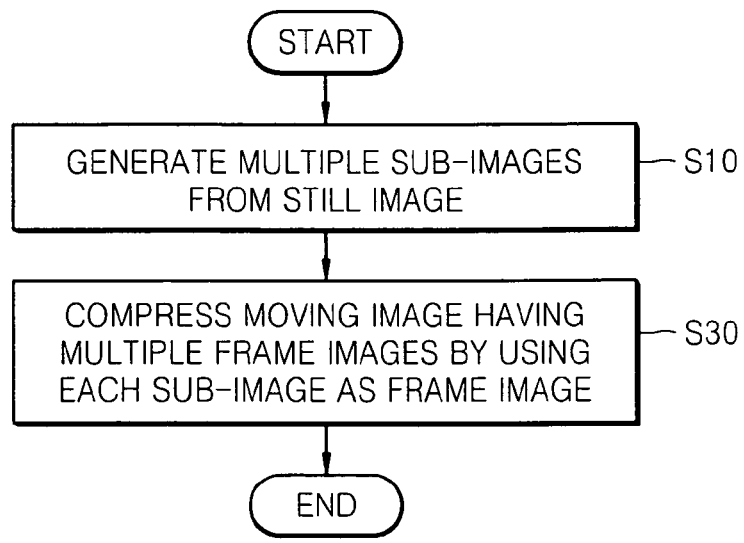
FIG. 9 is a flowchart of an example of a method of controlling a digital image processing apparatus according to an embodiment of the present invention.

FIG. 9 is a flowchart of an example of a method of controlling a digital image processing apparatus according to an embodiment of the present invention. Referring to FIG. 9, a plurality of sub-images are generated from a still image, in operation S10. The still image is considered as a moving image by using each of the sub-images as a frame image and the moving image having the frame images is compressed, in operation S30. The moving image can be compressed using conventional various moving image compression methods including the method above-described with reference to FIGS. 2 and 3.

In operation S10, the still image can be split into sub-images having sizes acceptable by a moving image compressor of the digital image processing apparatus or split into sub-images having the same or substantially the same size. Here, the still image can be split as illustrated in FIG. 3 to generate sub-images or the still image can be sub-sampled to generate sub-images having sizes acceptable by the moving image compressor of the digital image processing apparatus. In the latter case, when the still image is reduced and displayed on a display unit of the digital image processing apparatus, one of the sub-images obtained through sub-sampling can be displayed on the display unit.

Figure 10:
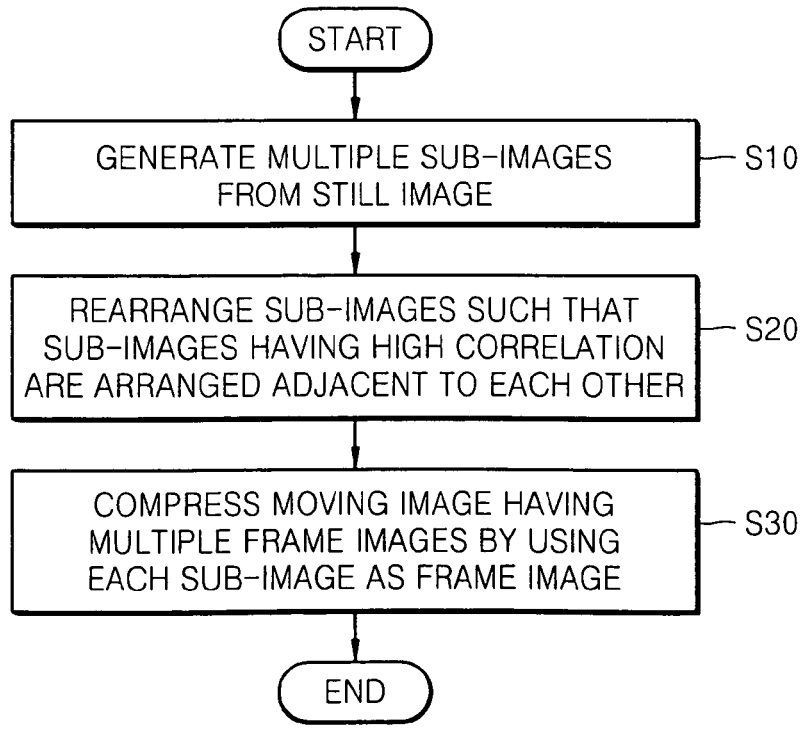
FIG. 10 is a flowchart of an example of a method of controlling a digital image processing apparatus according to another embodiment of the present invention.

FIG. 10 is a flowchart of an example of a method of controlling a digital image processing apparatus according to another embodiment of the present invention. The method illustrated in FIG. 10 further includes operation S20 of rearranging sub-images such that sub-images having high correlation are arranged adjacent to each other, in addition to operations S10 and S30 of the method illustrated in FIG. 9, to significantly reduce the quantity of data extracted from sub-images. Here, it can be determined that sub-images have high correlation when similarity of the sub-images is high, and correlation between sub-images can be judged by calculating a correlation coefficient Cost$_{n,m}$ using the aforementioned Equation 1.

A program for executing the above-described methods of controlling a digital image processing apparatus in a digital photographing apparatus can be stored in a recording medium. The recording medium can correspond to the recording medium 70 or the memory 60 illustrated in FIG. 8 or other recording media. The recording medium includes a magnetic storage medium, a ROM, a floppy disk, a hard disk, and an optical reading medium (for example, a CD-ROM and a DVD). The recording medium can correspond to the CPU 100 or a part of the CPU 100 illustrated in FIG. 8.

The above-described method of controlling a digital image processing apparatus can be modified to a method of compressing a still image in a digital system such as a computer. That is, a plurality of sub-images are generated from a still image, the still image is considered as a moving image by using each of the sub-images as a frame image and the moving image having the frame images is compressed in the digital system, as described with reference to FIGS. 2, 3, 4A and 4B.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A still image compressing apparatus comprising:
   a memory to store image data;
   a sub-image generator to generate a plurality of same-resolution sub-images from a still image; and
   a moving image compressor to form a moving image having the sub-images as frames of the moving image, and compress the moving image to form a compressed representation of the still image;
   wherein the moving image is generated to store the still image when a storage capacity of the memory is not sufficient to store additional data.

2. The still image compressing apparatus of claim 1, wherein the sub-image generator is to split the still image into the sub-images having sizes acceptable by the moving image compressor.

3. The still image compressing apparatus of claim 1, wherein the sub-image generator is to split the still image into the sub-images having substantially the same size.

4. The still image compressing apparatus of claim 1, wherein the sub-image generator is to sub-sample the still image to generate the sub-images having sizes acceptable by the moving image compressor.

5. The still image compressing apparatus of claim 1, further comprising a display unit to display one of the sub-images generated by the sub-image generator when displaying the still image.

6. The digital image processing apparatus of claim 1, wherein the moving image compressor compresses the moving image using MPEG or H.264.

7. The digital image processing apparatus of claim 1, wherein the moving image compressor considers only the sub-images selected by a user as the frame images.

8. A digital image processing apparatus comprising:
   a sub-image generator for generating at least one sub-images from a still image;
   a moving image compressor for considering the still image as a moving image by using each of the sub-images as a frame image, and compressing the moving image having the frame images; and
   a sub-image rearrangement unit for rearranging the sub-images generated by the sub-image generator such that sub-images having high correlation are arranged adjacent to each other, wherein the moving image compressor considers the still image as the moving image by using the rearranged sub-images as a series of frame images and compresses the moving image having the frame images.

9. The digital image processing apparatus of claim 8, wherein the sub-image rearrangement unit determines that sub-images have high correlation when similarity of the sub-images is high.

10. The digital image processing apparatus of claim 8, further comprising a correlation coefficient calculator calculating a correlation coefficient $Cost_{n,m}$ between an $n^{th}$ sub-image and an $m^{th}$ sub-image, before being rearranged by the sub-image rearrangement unit, according to the following equation when data of a pixel (x, y) of the $n^{th}$ sub-image is $P_n(x, y)$, $$Cost_{n,m} = \sum_{x,y} |P_n(x, y) - P_m(x, y)|$$

wherein the sub-image rearrangement unit determines that the $n^{th}$ sub-image and the $m^{th}$ sub-image have high correlation when the correlation coefficient $Cost_{n,m}$ is small.

11. A method of compressing a still image, the method comprising:
   generating a plurality of same-resolution sub-images from the still image;
   forming a moving image having the sub-images as frames of the moving image; and
   compressing the moving image to form a compressed representation of the still image;
   wherein the moving image is generated to store the still image when a storage capacity of a memory to store image data is not sufficient to store additional data.

12. The method of claim 11, wherein the generating of the sub-images comprises splitting the still image into the sub-images having sizes acceptable by a moving image compressor of the digital image processing apparatus.

13. The method of claim 11, wherein the generating of the sub-images comprises splitting the still image into the sub-images having the same size.

14. The method of claim 11, wherein the generating of the sub-images comprises sub-sampling the still image to generate the sub-images having sizes acceptable by the moving image compressor of the digital image processing apparatus.

15. The method of claim 11, further comprising displaying one of the sub-images on a display unit of the digital image processing apparatus when displaying the still image on the display unit of the digital image processing apparatus.

16. The method of claim 11, wherein the compressing of the moving image uses MPEG or H.264.

17. A non-transitory recording medium storing instructions that, when executed, cause a machine to at least carry out the method of claim 11.

18. A method of controlling a digital image processing apparatus, the method comprising:
   generating at least one sub-images from a still image;
   considering the still image as a moving image by using each of the sub-images as a frame image; and
   compressing the moving image having the frame images, wherein the considering of the still image as a moving image comprises rearranging the sub-images such that sub-images having high correlation are arranged adjacent to each other, considering the still image as the moving image by using the rearranged sub-images as a series of frame images, and compressing the moving image having the frame images.

19. The method of claim 18, wherein it is determined that sub-images have high correlation when similarity of the sub-images is high.

20. The method of claim 18, further comprising calculating a correlation coefficient $Cost_{n,m}$ between an $n^{th}$ sub-image and an $m^{th}$ sub-image, before being rearranged by the sub-image rearrangement unit, according to the following equation when data of a pixel (x, y) of the $n^{th}$ sub-image is $P_n(x, y)$, $$Cost_{n,m} = \sum_{x,y} |P_n(x, y) - P_m(x, y)|$$

wherein it is determined that the $n^{th}$ sub-image and the $m^{th}$ sub-image have high correlation when the correlation coefficient $Cost_{n,m}$ is small.

* * * * *